United States Patent
Desaki et al.

(10) Patent No.: US 9,266,499 B2
(45) Date of Patent: Feb. 23, 2016

(54) ON/OFF DETECTING BUCKLE SWITCH

(71) Applicant: HOSIDEN CORPORATION, Osaka (JP)

(72) Inventors: Kenjiro Desaki, Osaka (JP); Hirofumi Koizumi, Osaka (JP); Takashi Ishibashi, Osaka (JP)

(73) Assignee: HOSIDEN CORPORATION, Osaka (JP)

( * ) Notice: Subject to any disclaimer, the term of this patent is extended or adjusted under 35 U.S.C. 154(b) by 123 days.

(21) Appl. No.: 14/354,291

(22) PCT Filed: Aug. 23, 2013

(86) PCT No.: PCT/JP2013/072501
§ 371 (c)(1),
(2) Date: Apr. 25, 2014

(87) PCT Pub. No.: WO2014/038393
PCT Pub. Date: Mar. 13, 2014

(65) Prior Publication Data
US 2014/0262706 A1    Sep. 18, 2014

(30) Foreign Application Priority Data

Sep. 4, 2012 (JP) .................................. 2012-194221

(51) Int. Cl.
*A44B 11/25* (2006.01)
*B60R 22/48* (2006.01)
*H01H 3/16* (2006.01)
*B60R 16/02* (2006.01)

(52) U.S. Cl.
CPC ................. *B60R 22/48* (2013.01); *B60R 16/02* (2013.01); *B60R 2022/4816* (2013.01)

(58) Field of Classification Search
CPC ......... H01H 3/16; H01H 13/00; H01H 13/04; H01H 13/06; H01H 13/14; H01H 13/20; H01H 13/22; H01H 13/36; H01H 13/50; H01H 13/46; H01H 2003/00; H01H 2003/02; H01H 2003/22; H01H 2003/32; H01H 2013/00; H01H 2013/04; H01H 2013/50; H01H 2231/026; B60R 22/48; A44B 11/25
USPC .................................................... 200/61.58 B
See application file for complete search history.

(56) References Cited

U.S. PATENT DOCUMENTS 3,781,497 A * 12/1973 Stephenson ............. B60R 22/48
                                              200/16 B
4,015,094 A *  3/1977 Gavagan ............ A44B 11/2511
                                              200/276

(Continued)

FOREIGN PATENT DOCUMENTS

JP       S63-104268      7/1988
JP       H05-6558 U      1/1993

(Continued)

*Primary Examiner* — Edwin A. Leon
*Assistant Examiner* — Anthony R. Jimenez
(74) *Attorney, Agent, or Firm* — Greenblum & Bernstein, P.L.C.

(57) ABSTRACT

An ON/OFF detecting buckle switch includes: a case in a housing shape; a slider insertion port equipped in an upper face of the case; a support portion equipped in an inner side face of the case; a fixed terminal provided with a notched portion in one end in a strip shape and the other end fixed to the inner side face of the case; a movable terminal in a strip shape having one area fixed to the support portion; a slider provided with a terminal press portion that projects inside the case penetrating through the slider insertion port of the case and the notched portion of the fixed terminal, and when pressed down, presses down an end of the movable terminal; a spring that biases the slider upward; and bent portions in a hook shape in the notched portion of the fixed terminal and an end of the movable terminal.

2 Claims, 7 Drawing Sheets

(56) References Cited

U.S. PATENT DOCUMENTS

| | | | |
|---|---|---|---|
| 7,084,362 B2 * | 8/2006 | Ebert | B60R 22/48 200/61.58 B |
| 2013/0175145 A1 | 7/2013 | Yamanaka et al. | |
| 2013/0175146 A1 | 7/2013 | Yamanaka et al. | |
| 2013/0175152 A1 | 7/2013 | Yamanaka et al. | |

FOREIGN PATENT DOCUMENTS

| | | |
|---|---|---|
| JP | 2003-031094 | 1/2003 |
| JP | 2005-190906 | 7/2005 |
| JP | 2006-347359 | 12/2006 |
| JP | 2009-240528 | 10/2009 |
| JP | 2011-146298 | 7/2011 |

* cited by examiner

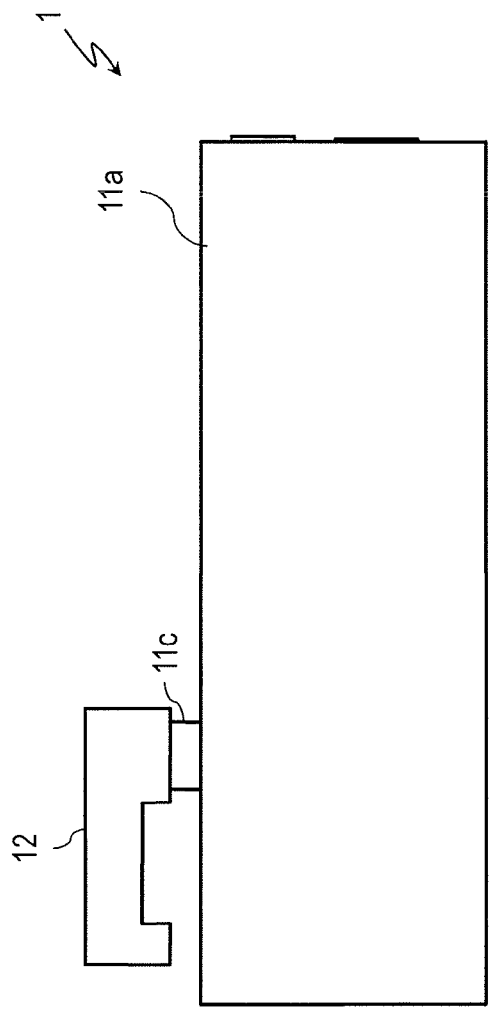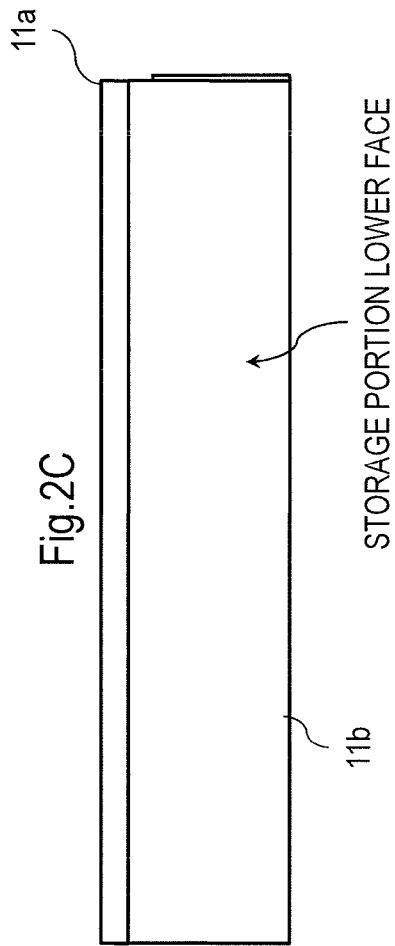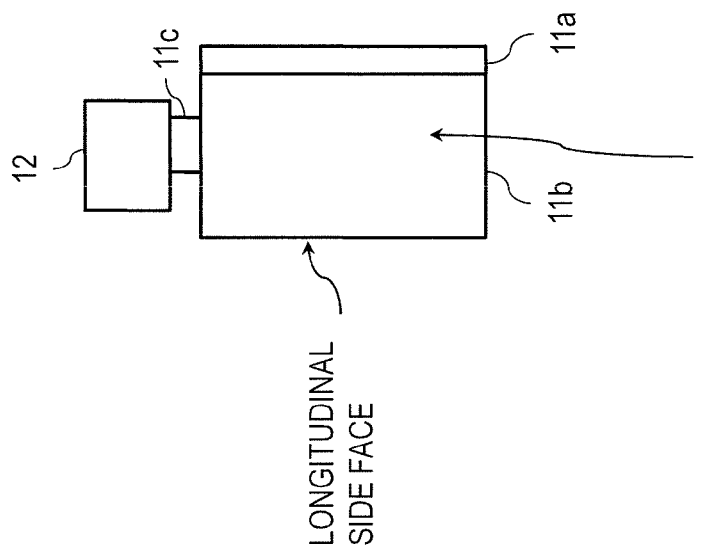

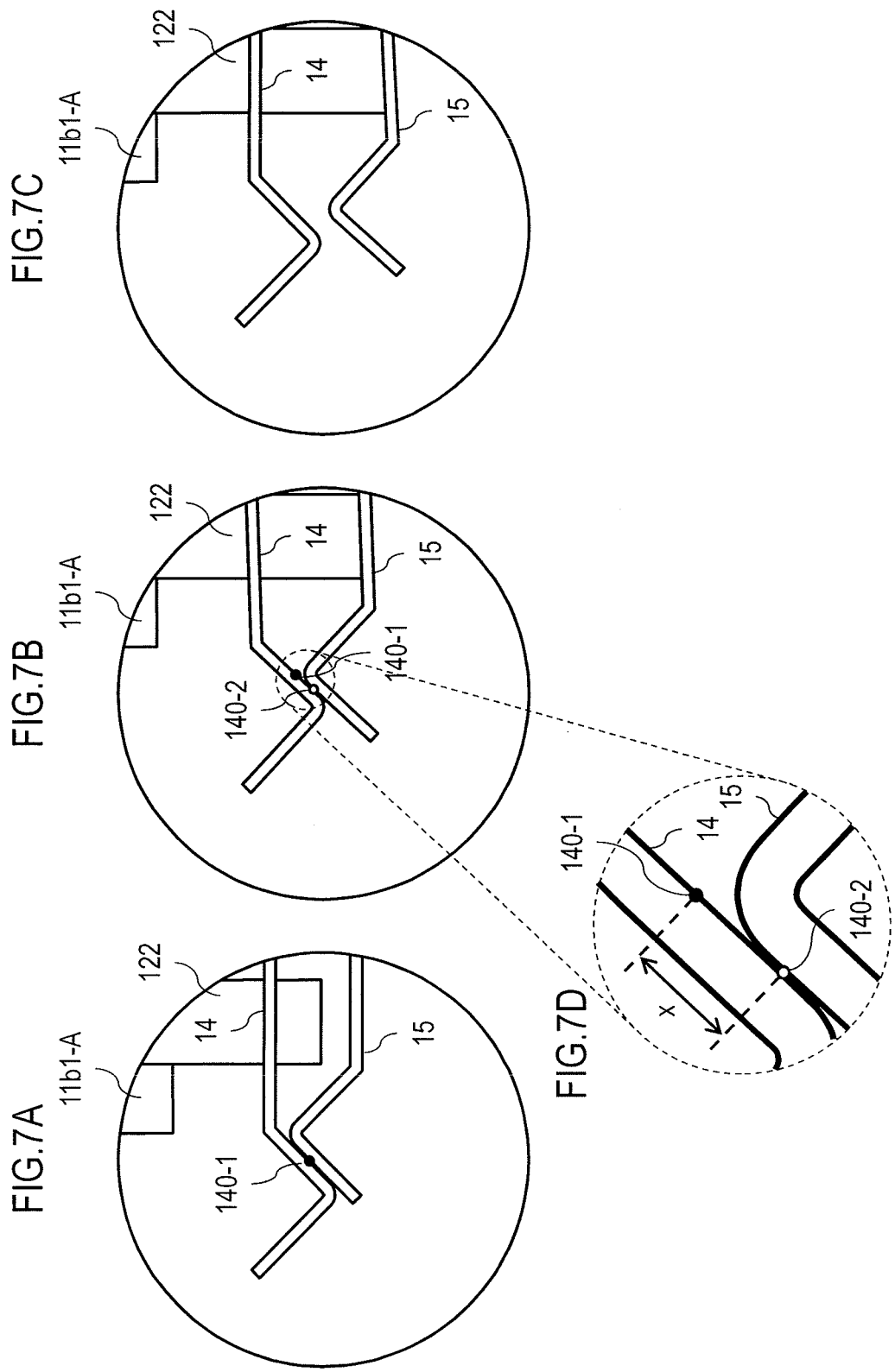

ON/OFF DETECTING BUCKLE SWITCH

TECHNICAL FIELD

The present invention relates to a buckle switch that detects insertion and removal of a tongue plate equipped in a seat belt to and from a buckle main body.

BACKGROUND ART

On a seat of an automobile and the like, a seat belt device is mounted in order to protect an occupant at the time of emergency, such as collision. For easy insertion and removal of a seat belt device of this type, a buckle device is equipped in a seat of an automobile and the like. A buckle device is configured to spring bias a latch member that latches a tongue plate in a latching direction and also to use a locking member to hold the latch member in a state in which the tongue plate and the buckle main body are latched. In such a buckle device, it is required to indicate by a lamp that the tongue plate and the buckle main body are in a latched state, to control actuation of a belt winding power reduction mechanism and the like, or to enable transmission of information of insertion and removal of a seat belt to an air bag ECU (electronic control unit). Therefore, a buckle switch that detects a latched state is equipped inside the buckle. As a prior art related to a buckle switch of this type, there are, for example, Patent Literature 1 shown below and the like. Among buckle switches, there is a switch of a type that detects only a state of contact point conduction/opening at the time of insertion and removal (hereinafter, referred to as an ON/OFF detecting buckle switch).

PRIOR ART LITERATURE

Patent Literature

Patent Literature 1: Japanese Utility Model Registration Application Laid Open No. S63-104268

SUMMARY OF THE INVENTION

Problems to be Solved by the Invention

In the case of an ON/OFF detecting buckle switch employing a butting contact point structure, a minute foreign matter may enter a contact point portion and interrupt conduction of the contact points with each other, causing a problem of a contact point failure. With that, it is an object of the present invention to provide an ON/OFF detecting buckle switch that is capable of effectively removing a foreign matter in a contact point portion.

Means to Solve the Problems

An ON/OFF detecting buckle switch of the present invention includes: a case in a housing shape; a slider insertion port equipped in an upper face of the case; a support portion equipped in an inner side face of the case; a fixed terminal provided with a notched portion in one end in a strip shape and the other end fixed to the inner side face of the case; a movable terminal in a strip shape having one area fixed to the support portion; a slider provided with a terminal press portion that projects inside the case penetrating through the slider insertion port of the case and the notched portion of the fixed terminal, and when pressed down, presses down an end of the movable terminal; a spring that biases the slider upward; and bent portions in a hook shape in the notched portion of the fixed terminal and an end of the movable terminal on a free end side.

In the ON/OFF detecting buckle switch of the present invention, when the slider is not pressed down, slopes of the bent portions of the fixed terminal and the movable terminal are contact surfaces, and the fixed terminal and the movable terminal make contact conductively, and when the slider is pressed down, the fixed terminal and the movable terminal are separated to be in an insulated state.

Effects of the Invention

According to the ON/OFF detecting buckle switch of the present invention, it is possible to effectively remove a foreign matter in a contact point portion.

BRIEF DESCRIPTION OF THE DRAWINGS

FIGS. 2A-2C are a three-view drawing of the ON/OFF detecting buckle switch in the first embodiment, where FIG. 2A is a side view, FIG. 2B is a front view, and FIG. 2C is a bottom view.

FIGS. 7A-7D are a set of drawings illustrating changes in a contact point position of a fixed terminal and a movable terminal associated with movement of the terminal press portion, where FIG. 7A is a drawing illustrating a contact point position when the slider is in an initial state, FIG. 7B is a drawing illustrating a contact point position in a state immediately before the slider is pressed down to separate the fixed terminal and the movable terminal, FIG. 7C is a drawing illustrating a state in which the slider is fully pressed down to separate the fixed terminal and the movable terminal, and FIG. 7D is an enlarged view of the vicinity of the contact point position in FIG. 7B.

DETAILED DESCRIPTION OF THE EMBODIMENTS

Detailed descriptions are given below to embodiments of the present invention. The same numeral is given to components having the same function and thus repetitive descriptions are omitted.

First Embodiment

Figure 1:
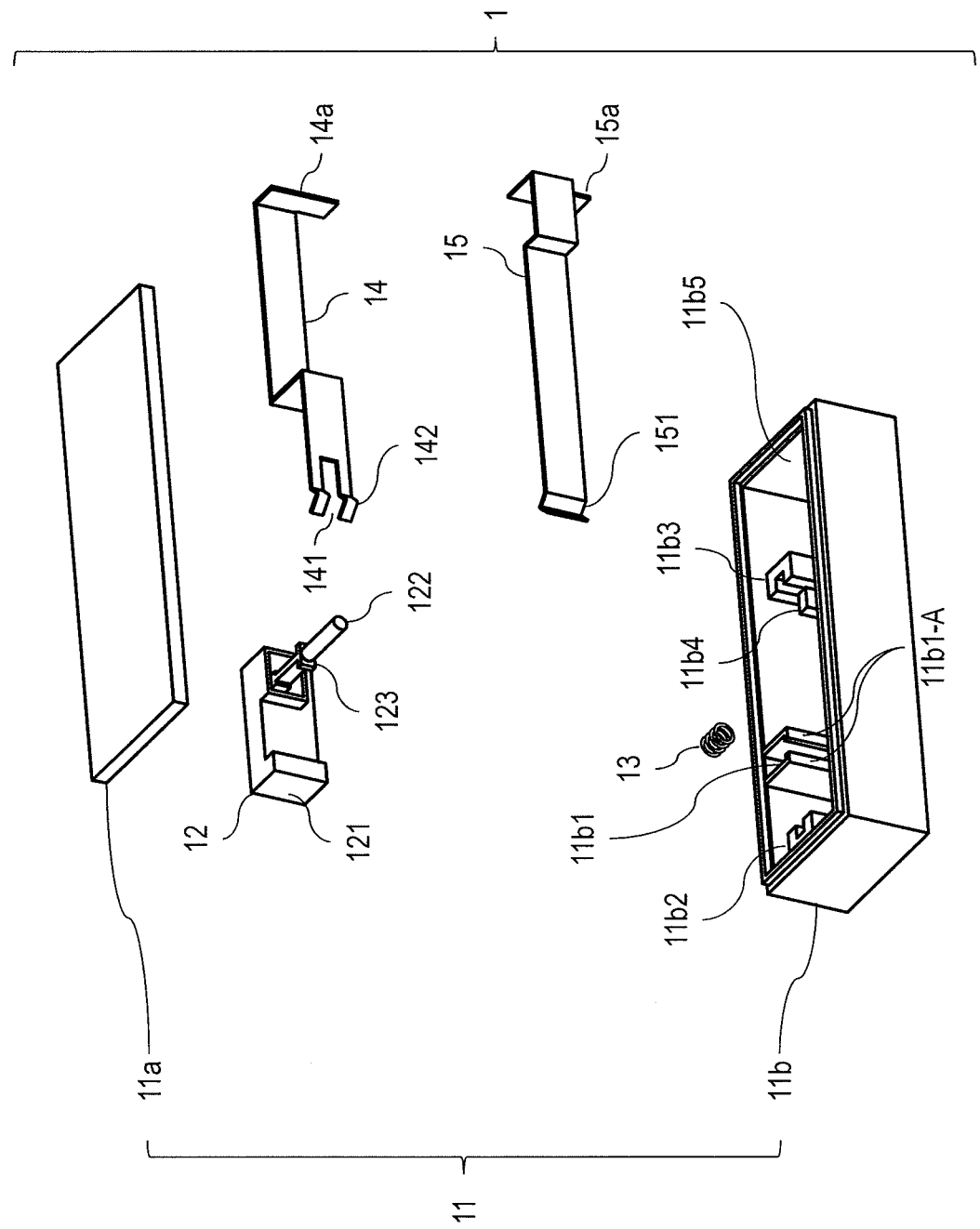
FIG. 1 is an exploded perspective view of an ON/OFF detecting buckle switch in a first embodiment.
Figure 3:
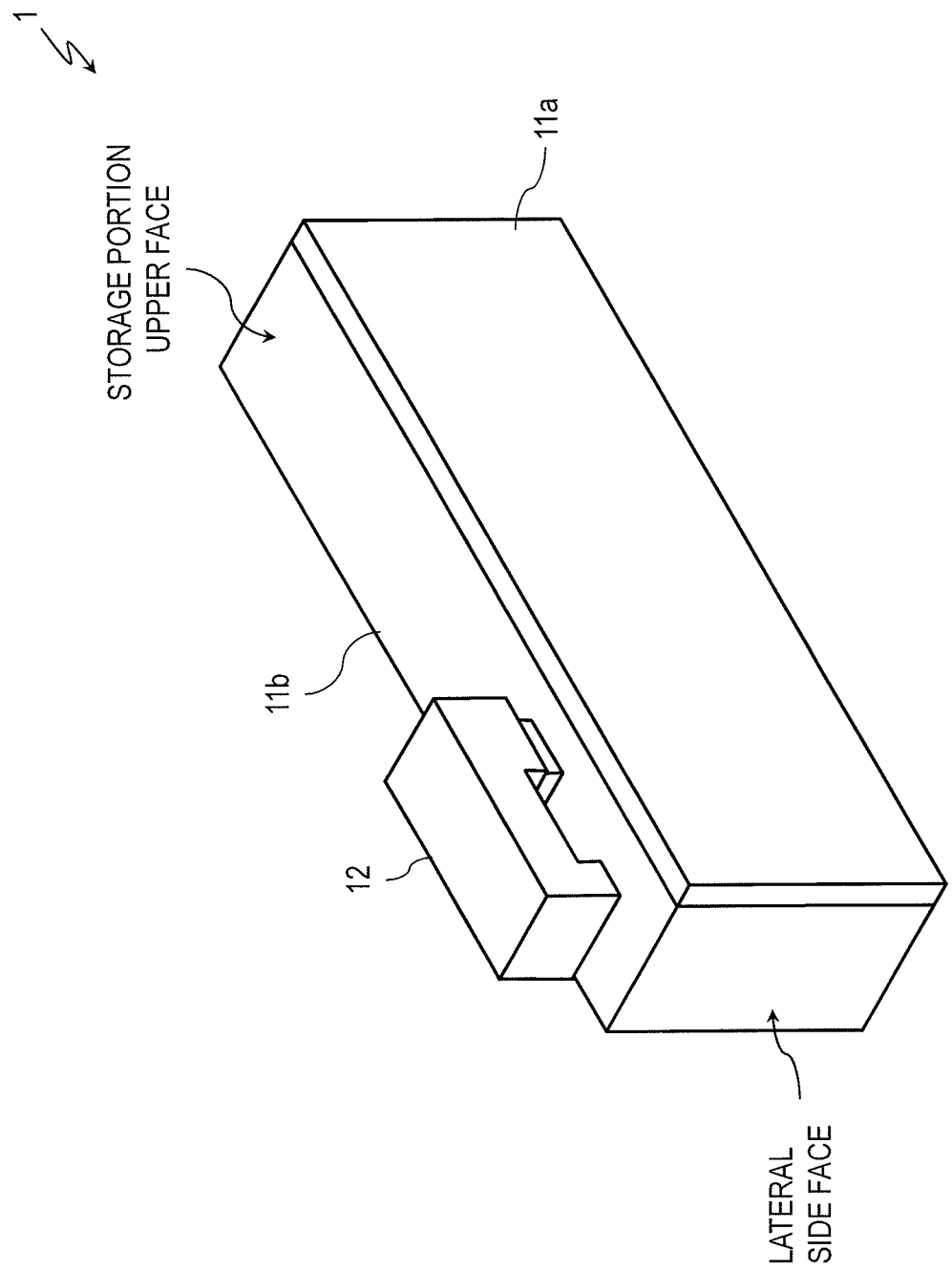
FIG. 3 is a perspective view of the ON/OFF detecting buckle switch in the first embodiment.
Figure 4:
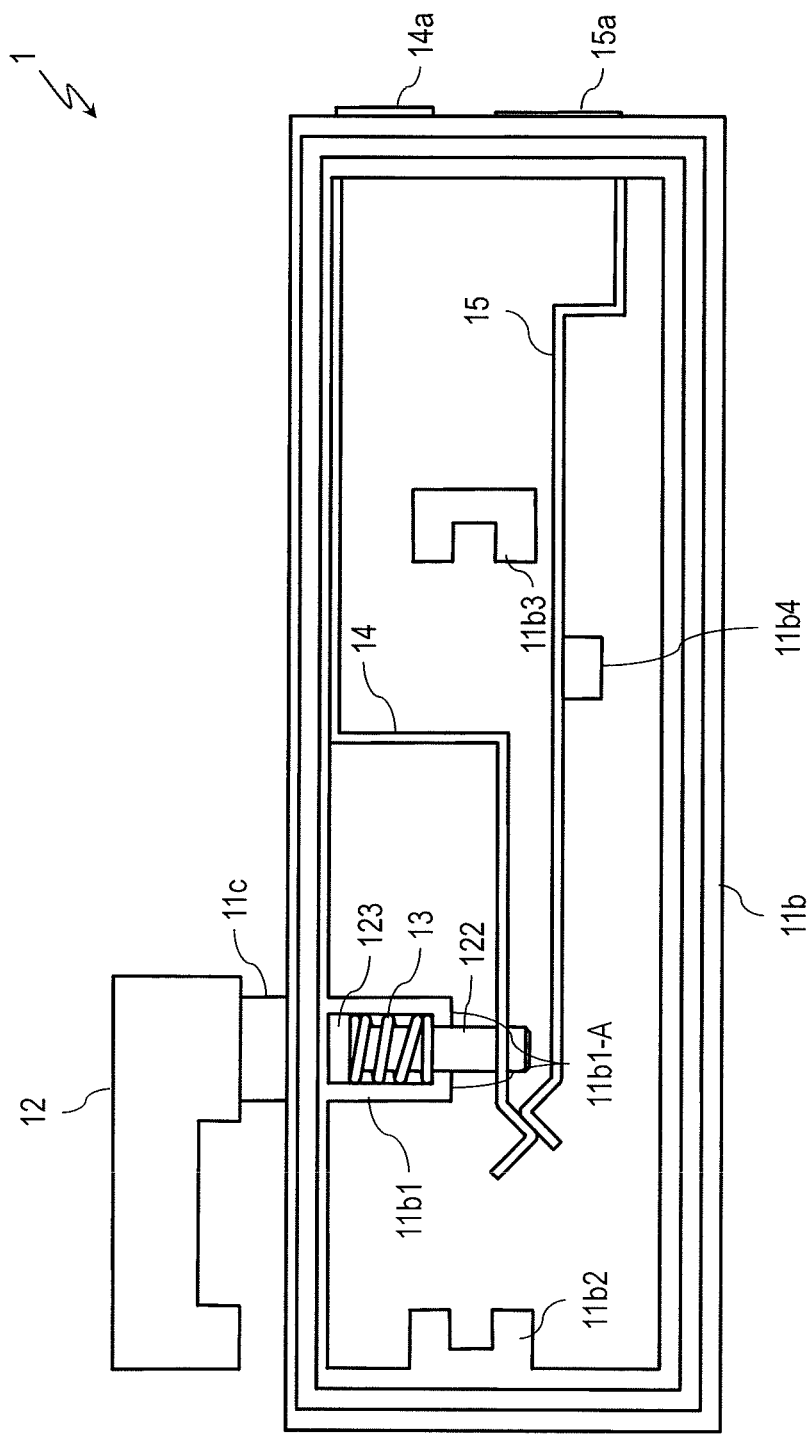
FIG. 4 is a front view of the ON/OFF detecting buckle switch in the first embodiment with a lid removed when a slider is in an initial state.
Figure 5:
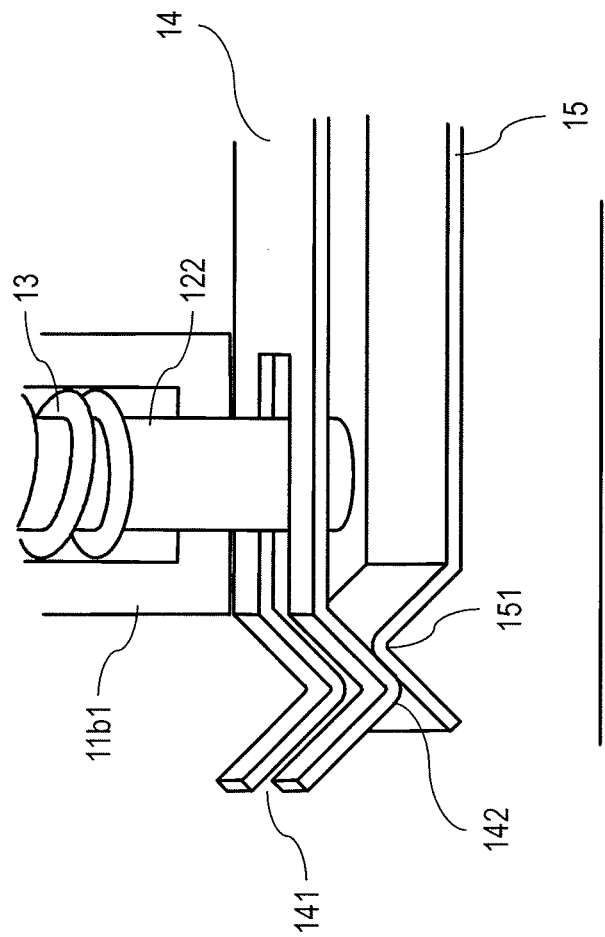
FIG. 5 is a perspective view illustrating relationship of a terminal press portion and a notched portion of a fixed terminal when a slider is in an initial state.
Figure 6:
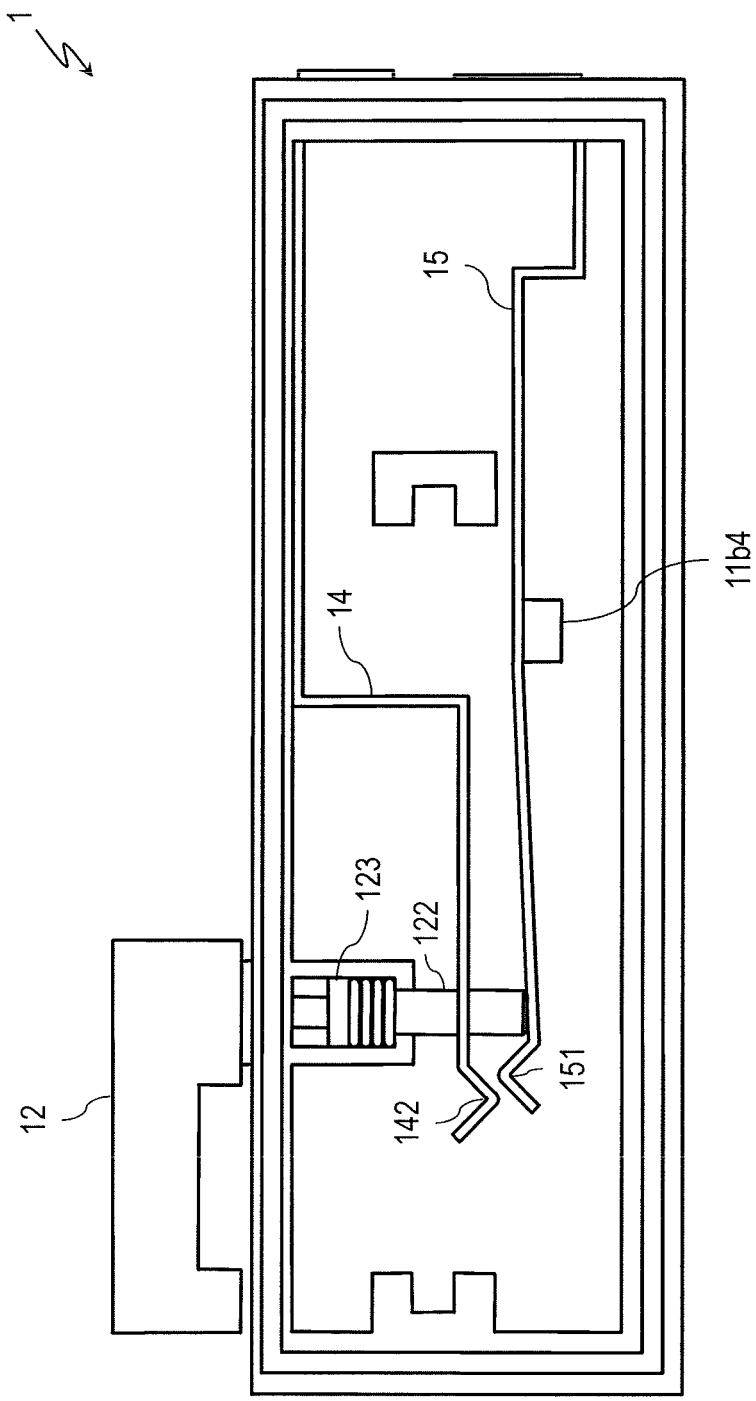
FIG. 6 is a front view of the ON/OFF detecting buckle switch in the first embodiment with a lid removed when a slider is in a latched state.

With reference to FIG. 1 through FIG. 6, an ON/OFF detecting buckle switch in a first embodiment of the present invention is described. FIG. 1 is an exploded perspective view of an ON/OFF detecting buckle switch 1 of the present embodiment. FIG. 2 is a three-view drawing of the ON/OFF detecting buckle switch 1 of the present embodiment. FIG. 2A is a side view, FIG. 2B is a front view, and FIG. 2C is a bottom view. FIG. 3 is a perspective view of the ON/OFF detecting buckle switch 1 of the present embodiment. FIG. 4 is a front view of the ON/OFF detecting buckle switch 1 of the present embodiment with a lid 11a removed when a slider 12 is in an initial state. FIG. 5 is a perspective view illustrating relationship of a terminal press portion 122 and a notched portion 141 of a fixed terminal 14 when the slider 12 is in the initial state. FIG. 6 is a front view of the ON/OFF detecting buckle switch 1 of the present embodiment with the lid 11a removed when the slider 12 is in a latched state.

As illustrated in FIG. 1, the ON/OFF detecting buckle switch 1 of the present embodiment is provided with a case 11 in a rectangular parallelepiped housing shape, and the case 11 is configured with a removable lid 11a and a storage portion 11b provided with an opening portion 11b5 allowed to be opened and closed by the lid 11a. The lid 11a and the storage portion 11b may be made of resin, such as PBT (polybutylene terephthalate). As illustrated in FIGS. 2 and 3, a side face facing the lid 11a of the storage portion 11b is referred to as a longitudinal side face, two side faces adjacent to the lid 11a are referred to as lateral side faces, and the remaining faces are referred to as a storage portion upper face and a storage portion lower face. Inside the storage portion upper face of the storage portion 11b, a spring storage portion 11b1 that is in an approximately square tube shape and has an open lower face and two open side faces is equipped. In a lower end portion of the spring storage portion 11b1, spring position fixing nails 11b1-A are equipped.

In one of the lateral inner side faces of the storage portion 11b, a first groove portion 11b2 is equipped. In the middle of inside the longitudinal side face of the storage portion 11b, a second groove portion 11b3 in a square tube shape having an opening portion as a groove is equipped to have the groove facing the groove of the first groove portion 11b2. The first groove portion 11b2 and the second groove portion 11b3 are members for positioning and fixing a printed circuit board for resistance value detection. In addition, in the middle of the longitudinal inner side face of the storage portion 11b, on a slightly lower side of the second groove portion 11b3, a support portion 11b4 in a square bar shape that supports a movable terminal 15 described later is equipped vertically to the longitudinal inner side face.

In the storage portion 11b, the slider 12, a spring 13, the fixed terminal 14, and the movable terminal 15 are stored. The slider 12 is provided with a tongue plate contact portion 121 in an approximately plate shape and the terminal press portion 122 in an approximately round bar shape that is equipped vertically to a lower face of the tongue plate contact portion 121. In the middle of the terminal press portion 122, a collar 123 is equipped. The slider 12 may be made of sliding resin, such as POM (polyoxymethylene), for example. As illustrated in FIGS. 2, a slider insertion port 11c in a square tube shape is equipped outside the upper face of the storage portion 11b, and the terminal press portion 122 of the slider 12 is inserted into the slider insertion port 11c as illustrated in FIG. 4. A lower end of the terminal press portion 122 projects into the case penetrating through the slider insertion port 11c and the opening portion in the lower end of the spring storage portion 11b1. At this time, the spring 13 is stored in the spring storage portion 11b1 of the storage portion 11b, and the terminal press portion 122 of the slider 12 penetrates through an inner space of the spring 13. The spring 13 is positioned in a position containing the terminal press portion 122 by the spring storage portion 11b1 and the spring position fixing nails 11b1-A. When the slider 12 is pressed down, the spring 13 is compressed while being sandwiched between the collar 123 and the spring position fixing nails 11b1-10 A. The spring 13 may be made of metal, such as a steel material and phosphor bronze.

The fixed terminal 14 is a conductor in an elongated and thin plate shape (strip shape), and is folded stepwise in the middle so as to avoid the second groove portion 11b3. The fixed terminal 14 may be of a material, such as brass and phosphor bronze, for example. One end of the fixed terminal 14 is folded downward to form a folded portion 14a. The folded portion 14a is mounted and fixed to be exposed to outside the side face facing the lateral side face equipped with the first groove portion 11b2 of the storage portion 11b. As illustrated in FIG. 5, in the end of the fixed terminal 14 opposite to the folded portion 14a, the notched portion 141 is formed. Tip ends of the notched portion 141 are subjected to a bending process to be a hook shape, and the bent portions 142 make contact with the movable terminal 15. The movable terminal 15 is a conductor in an elongated and thin plate shape (strip shape) similar to the fixed terminal 14, and is folded stepwise in the middle. The movable terminal 15 may be of a material, such as brass and phosphor bronze, for example, similar to the fixed terminal 14. One end of the movable terminal 15 is folded upward to form a folded portion 15a. The folded portion 15a is mounted and fixed to be exposed to outside the same side face as the folded portion 14a on a slightly lower side from the folded portion 14a to have the movable terminal 15 approximately parallel to the fixed terminal 14. The movable terminal 15 is arranged to be located on an upper face of the support portion 11b4 described above. The end of the movable terminal 15 opposite to the folded portion 15a is subjected to a bending process to be a hook shape to form a bent portion 151, and the bent portion 151 lightly makes contact with the bent portions 142 of the fixed terminal 14. At this time, the contact point of the fixed terminal 14 and the movable terminal 15 is adjusted to be placed on slopes of the bent portions (hereinafter, may also be referred to as contact surfaces). When the slider 12 is pressed down and the terminal press portion 122 projects deeply into the storage portion 11b, the terminal press portion 122 is in a position to penetrate through the notched portion 141 of the fixed terminal 14. Therefore, when the slider 12 is pressed, the terminal press portion 122 hits the upper face of the movable terminal 15 below it to press down the movable terminal 15, without making contact with the fixed terminal 14. At this time, the movable terminal 15 functions as a cantilever spring with the support portion 11b4 as a fixed end and the end on the bent portion 151 side as a free end as illustrated in FIG. 6. That is, as illustrated in FIG. 6, the bent portion 151 of the movable terminal 15 is pressed down by the terminal press portion 122 of the slider 12 to have the tip end sinking downward, so that the bent portions 142 of the fixed terminal 14 and the bent portion 151 of the movable terminal 15 are separated.

For example, the folded portion 14a is connected to a higher voltage side of a power source and the folded portion 15a to a lower voltage side of the power source and a signal for detection is flown from the power source (not shown), thereby enabling detection of a predetermined current value because the bent portions 142 of the fixed terminal 14 and the bent portion 151 of the movable terminal 15 are in a contact state when the slider 12 is in the initial state. In contrast, when the slider 12 is pressed down by a tongue plate (not shown) to be in a latched state, the bent portions 142 of the fixed terminal 14 and the bent portion 151 of the movable terminal 15 are separated, so that a current value is not detected. Accordingly, depending on whether or not a current value is detected, it is possible to determine whether the slider 12 is in the initial state or in the latched state.

Thus, the ON/OFF detecting buckle switch 1 of the present embodiment has the fixed terminal 14 and the movable terminal 15 equipped with the bent portions 142 and 151 in a hook shape and the contact point of both terminals adjusted to be placed on the slopes (contact surfaces) of the bent portions, so that relative to vertically downward movement of the end of the movable terminal 15 on the free end side, it is possible to greatly shift the contact point position while remaining in a state in which the fixed terminal 14 and the movable terminal 15 are in contact. While the ON/OFF detecting buckle switch 1 of the present embodiment is configured in such a manner that the contact surfaces of both terminals make an angle of approximately 45° relative to the horizontal plane, the angle of the contact surfaces is not limited and the contact surfaces may be provided with a certain inclination relative to the horizontal plane.

With reference to FIG. 7, for a case where a foreign matter enters a contact point of the fixed terminal 14 and the movable terminal 15 in the ON/OFF detecting buckle switch 1 of the present embodiment, a consideration is given below to a contact point movement distance required to remove the foreign matter from the contact point. FIG. 7 is a set of drawings illustrating changes in the contact point position of the fixed terminal 14 and the movable terminal 15 associated with movement of the terminal press portion 122. FIG. 7A is a drawing illustrating a contact point position when the slider 12 is in the initial state. FIG. 7B is a drawing illustrating a contact point position in a state immediately before the slider 12 is pressed down to separate the fixed terminal 14 and the movable terminal 15. FIG. 7C is a drawing illustrating a state in which the slider 12 is fully pressed down to separate the fixed terminal 14 and the movable terminal 15. FIG. 7D is an enlarged view of the vicinity of the contact point position in FIG. 7B. When the slider 12 is not pressed down as illustrated in FIG. 7A, the fixed terminal 14 makes contact with the movable terminal 15 in a first contact point 140-1. When the slider 12 is pressed down and the lower end of the terminal press portion 122 presses down the middle of the movable terminal 15, a frictional force is generated in the first contact point 140-1 of the fixed terminal 14, and the fixed terminal 14 is pulled down slightly along with the movable terminal 15. When the force to press down the terminal press portion 122 becomes greater than the frictional force, the fixed terminal 14 starts sliding on the movable terminal 15. The fixed terminal 14 slides on the movable terminal 15, thereby displacing the position of the contact point downward. As illustrated in FIG. 7B, in a state immediately before the fixed terminal 14 and the movable terminal 15 are separated, the contact point of the fixed terminal 14 and the movable terminal 15 is defined as a second contact point 140-2. As illustrated in FIG. 7D, the first contact point 140-1 and the second contact point 140-2 are assumed to be in positions separated by a distance x. The distance x may also be considered as a distance where the fixed terminal 14 has slid on the movable terminal 15. When the distance x is set appropriately, it is possible to effectively remove a minute foreign matter (dirt, dust, and the like) that has entered the vicinity of the contact point. As a result of considering both a general size of a foreign matter and the structural properties of the ON/OFF detecting buckle switch of the present embodiment, it was found that a foreign matter may be removed sufficiently by setting the distance x to approximately 0.14 mm. Since a greater effect of removing a foreign matter may be expected from a greater distance x, the distance x may be 0.14 mm or more.

It is also possible to define the first contact point 140-1 and the second contact point 140-2 described above in another method. There may be a state in which the terminal press portion 122 is pressed down deeply and the fixed terminal 14 and the movable terminal 15 are separated (latched state). Then, when the tongue plate is released and the terminal press portion 122 moves upward by the elastic force of the spring 13, the end of the movable terminal 15 on the free end side returns upward by the elastic force of itself. In this process, the bent portions 142 of the fixed terminal 14 make contact with the bent portion 151 of the movable terminal 15 again. The contact point of the fixed terminal 14 with the movable terminal 15 at the moment of contact is defined as the second contact point 140-2. After that, while the fixed terminal 14 and the movable terminal 15 jostle each other in the contact point, the fixed terminal 14 slides on the movable terminal 15 due to the elastic force of the movable terminal 15 and the elastic force of the movable terminal 15 decreases. When the elastic force of the movable terminal 15 and the frictional force in the contact point become equal, the position of a contact point is defined as the first contact point 140-1. The distance x of the first contact point 140-1 and the second contact point 140-2 may be 0.14 mm or more similar to the above.

Thus, according to the ON/OFF detecting buckle switch 1 of the present embodiment, the fixed terminal 14 and the movable terminal 15 are equipped with the bent portions 142 and 151, thereby adjusting the contact point of both terminals to be placed on the slopes. The contact point position greatly shifts relative to the vertically downward movement of the end of the movable terminal 15 on the free end side while the fixed terminal 14 and the movable terminal 15 remain in contact. Accordingly, it is possible to effectively remove a foreign matter in the contact point portion.

DESCRIPTION OF REFERENCE NUMERALS

1 ON/OFF Detecting Buckle Switch
11 Case
11a Lid
11b Storage Portion
11b1 Spring Storage Portion
11b1-A Spring Position Fixing Nail
11b2 First Groove Portion
11b3 Second Groove Portion
11b4 Support Portion
11b5 Opening Portion
11c Slider Insertion Port
12 Slider
121 Tongue Plate Contact Portion
122 Terminal Press Portion
123 Collar
13 Spring
14 Fixed Terminal
14a Folded Portion
141 Notched Portion
142 Bent Portion
140-1 First Contact Point
140-2 Second Contact Point
15 Movable Terminal
15a Folded Portion
151 Bent Portion

What is claimed is:
1. An ON/OFF detecting buckle switch comprising:
a case in a housing shape;
a slider insertion port equipped in an upper face of the case;
a support portion equipped in an inner side face of the case;
a fixed terminal provided with a notched portion in one end in a strip shape and the other end fixed to the inner side face of the case;

a movable terminal in a strip shape having one area fixed to the support portion;

a slider provided with a terminal press portion that projects inside the case penetrating through the slider insertion port of the case and the notched portion of the fixed terminal, and when pressed down, presses down an end of the movable terminal;

a spring that biases the slider upward; and bent portions in a hook shape in the notched portion of the fixed terminal and an end of the movable terminal on a free end side, wherein when the slider is not pressed down, slopes of the bent portions of the fixed terminal and the movable terminal are contact surfaces, and the fixed terminal and the movable terminal make contact conductively, and when the slider is pressed down, the fixed terminal and the movable terminal are separated to be in an insulated state.

2. The ON/OFF detecting buckle switch according to claim 1, wherein if a contact area of the fixed terminal and the movable terminal is referred to as a first contact point when the slider is not pressed down, and a contact area of the fixed terminal and the movable terminal is referred to as a second contact point in a state immediately before the slider is pressed down and the fixed terminal and the movable terminal are separated, a distance of the first contact point and the second contact point is 0.14 mm or more.

* * * * *